United States Patent
Wolf

(10) Patent No.: US 8,144,806 B2
(45) Date of Patent: Mar. 27, 2012

(54) DEVICE, SYSTEM AND METHOD OF I/Q MISMATCH CORRECTION

(75) Inventor: Guy Wolf, Petach Tikva (IL)

(73) Assignee: Marvell International Ltd., Hamilton (BM)

( * ) Notice: Subject to any disclaimer, the term of this patent is extended or adjusted under 35 U.S.C. 154(b) by 998 days.

(21) Appl. No.: 10/949,330

(22) Filed: Sep. 27, 2004

(65) Prior Publication Data
US 2006/0067424 A1    Mar. 30, 2006

(51) Int. Cl.
*H04L 25/49* (2006.01)
(52) U.S. Cl. ......... 375/296; 375/357; 375/371; 375/295
(58) Field of Classification Search .................. 375/296, 375/357, 371
See application file for complete search history.

(56) References Cited

U.S. PATENT DOCUMENTS

| | | | | |
|---|---|---|---|---|
| 4,085,378 A * | 4/1978 | Ryan et al. | ..................... | 329/308 |
| 5,705,949 A * | 1/1998 | Alelyunas et al. | ............. | 329/304 |
| 5,949,821 A * | 9/1999 | Emami et al. | ................. | 375/235 |
| 6,122,325 A * | 9/2000 | Mogre et al. | .................. | 375/261 |
| 6,330,290 B1 * | 12/2001 | Glas | ............... | 375/324 |
| 6,442,217 B1 * | 8/2002 | Cochran | ....... | 375/326 |
| 6,670,900 B1 * | 12/2003 | Zhang | .......................... | 341/118 |
| 6,785,529 B2 * | 8/2004 | Ciccarelli et al. | ............. | 455/324 |
| 7,020,226 B1 * | 3/2006 | Kirkland | ....................... | 375/355 |
| 7,061,994 B2 * | 6/2006 | Li et al. | ........................ | 375/316 |
| 7,099,399 B2 * | 8/2006 | McCallister | ................... | 375/269 |
| 7,123,896 B2 * | 10/2006 | Chiu | .............. | 455/313 |
| 7,274,750 B1 * | 9/2007 | Mueller | ........................ | 375/297 |
| 7,280,619 B2 * | 10/2007 | Nemer et al. | ................. | 375/323 |
| 2002/0122471 A1 * | 9/2002 | Ling | ............................. | 375/147 |
| 2003/0007574 A1 * | 1/2003 | Li et al. | ......................... | 375/316 |
| 2003/0231726 A1 * | 12/2003 | Schuchert et al. | ............ | 375/350 |
| 2004/0095993 A1 * | 5/2004 | Liu et al. | ....................... | 375/219 |
| 2004/0203472 A1 * | 10/2004 | Chien | ............................. | 455/68 |
| 2004/0263262 A1 * | 12/2004 | Ravi et al. | ...................... | 331/46 |
| 2005/0135521 A1 * | 6/2005 | Nemer et al. | ................. | 375/350 |
| 2005/0152476 A1 * | 7/2005 | Coersmeier | ................... | 375/322 |
| 2005/0276354 A1 * | 12/2005 | Su et al. | ....................... | 375/326 |
| 2006/0063497 A1 * | 3/2006 | Nielsen | ......................... | 455/118 |
| 2007/0123188 A1 * | 5/2007 | Mo et al. | ....................... | 455/302 |
| 2008/0095266 A1 * | 4/2008 | Rashev et al. | ................ | 375/298 |

OTHER PUBLICATIONS

U.S. Appl. No. 09/621,388, filed Jul. 21, 2000, Yellin et al.
Fang et al., "An IQ Imbalance Compensation for OFDM and Quadrature Receivers", http://www.priorartdatabase.com/IPCOM/000010607D Published Dec. 20, 2002.

* cited by examiner

*Primary Examiner* — Kenneth Lam

(57) ABSTRACT

Briefly, some embodiments of the invention may provide devices, systems and methods of in-phase and quadrature mismatch analysis and correction. For example, a method in accordance with an embodiment of the invention may include re-encoding an estimated symbol of an input signal having an in-phase component and a quadrature component, based on an analysis of a mismatch between said in-phase component and said quadrature component.

6 Claims, 3 Drawing Sheets

US 8,144,806 B2

DEVICE, SYSTEM AND METHOD OF I/Q MISMATCH CORRECTION

BACKGROUND OF THE INVENTION

A first wireless communication device may transmit data using an In-phase (I) signal and a Quadrature (Q) signal, which may have a phase-shift of 90 degrees relative to the I signal. The I and Q (I/Q) signals may be received by a second wireless communication device, and may have an I/Q mismatch. For example, an I/Q mismatch may occur when the gain of the I signal is different from the gain of the Q signal, or when the phase-shift between the I and the Q signals is not exactly 90 degrees. An I/Q mismatch, for example, may impair the ability of the second wireless communication device to correctly receive and process data carried by the I/Q signals, or may impair performance of the second communication device, e.g., in high Signal to Noise Ratio (SNR) communications.

Some wireless communication devices may partially mitigate problems related to I/Q mismatch by utilizing highly precise components having matching amplitude and phase characteristic. However, such highly precise components may be very expensive, and their utilization may still result in some I/Q mismatch errors.

BRIEF DESCRIPTION OF THE DRAWINGS

The subject matter regarded as the invention is particularly pointed out and distinctly claimed in the concluding portion of the specification. The invention, however, both as to organization and method of operation, together with features and advantages thereof, may best be understood by reference to the following detailed description when read with the accompanied drawings in which:

Figure 1:
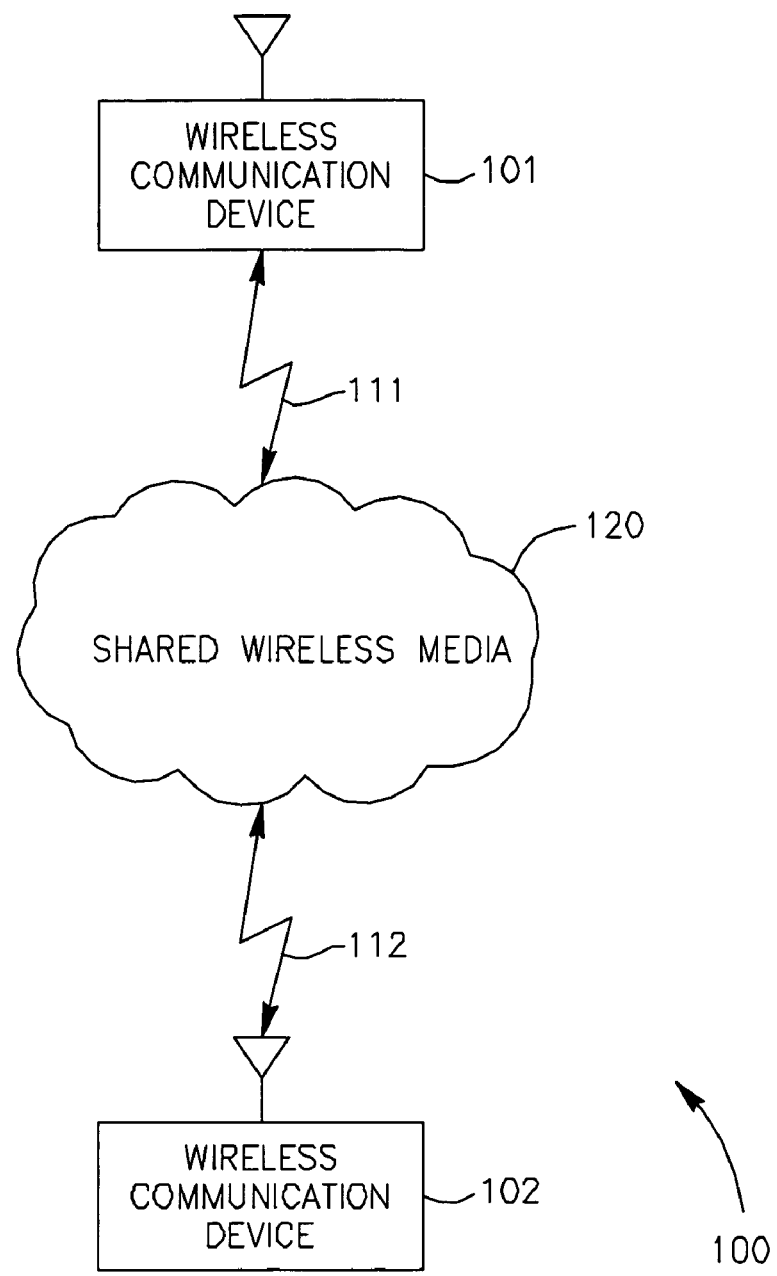
FIG. 1 is a schematic block diagram illustration of a wireless communication system including one or more wireless communication devices utilizing I/Q mismatch correction in accordance with exemplary embodiments of the invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE INVENTION

In the following detailed description, numerous specific details are set forth in order to provide a thorough understanding of the invention. However, it will be understood by those of ordinary skill in the art that the invention may be practiced without these specific details. In other instances, well-known methods, procedures, components, units and/or circuits have not been described in detail so as not to obscure the invention.

It should be understood that embodiments of the invention may be used in a variety of applications. Although the invention is not limited in this respect, embodiments of the invention may be used in conjunction with many apparatuses, for example, a receiver, a transceiver, a transmitter-receiver, a wireless communication station, a wireless communication device, a wireless Access Point (AP), a processor, a controller, a modem, a wireless modem, a Personal Digital Assistant (PDA) device, a cellular telephone, a wireless telephone, a Personal Communication Systems (PCS) device, a PDA device which incorporates a wireless communication device, or the like.

FIG. 1 schematically illustrates a block diagram of a wireless communication system 100 including one or more wireless communication devices utilizing I/Q mismatch correction in accordance with exemplary embodiments of the invention. System 100 may include one or more wireless communication devices, for example, devices 101 and 102.

Device 101 and device 102 may communicate between themselves over a shared wireless media 120, which may include, for example, wireless communication links 111 and 112. For example, device 101 may communicate with one or more other devices of system 100 through link 111, and device 102 may communicate with one or more other devices of system 100 through link 112.

In accordance with some embodiments of the invention, device 101 may transmit a wireless communication signal having In-phase (I) and Quadrature (Q) components (referred to herein as "I/Q signal"). As described in detail below, device 102 may receive the I/Q signal, estimate a channel and symbols, re-encode the symbols, and calculate and correct an I/Q mismatch. Device 102 may repeat these operations as may be necessary to sufficiently reduce or eliminate the I/Q mismatch.

Figure 2:
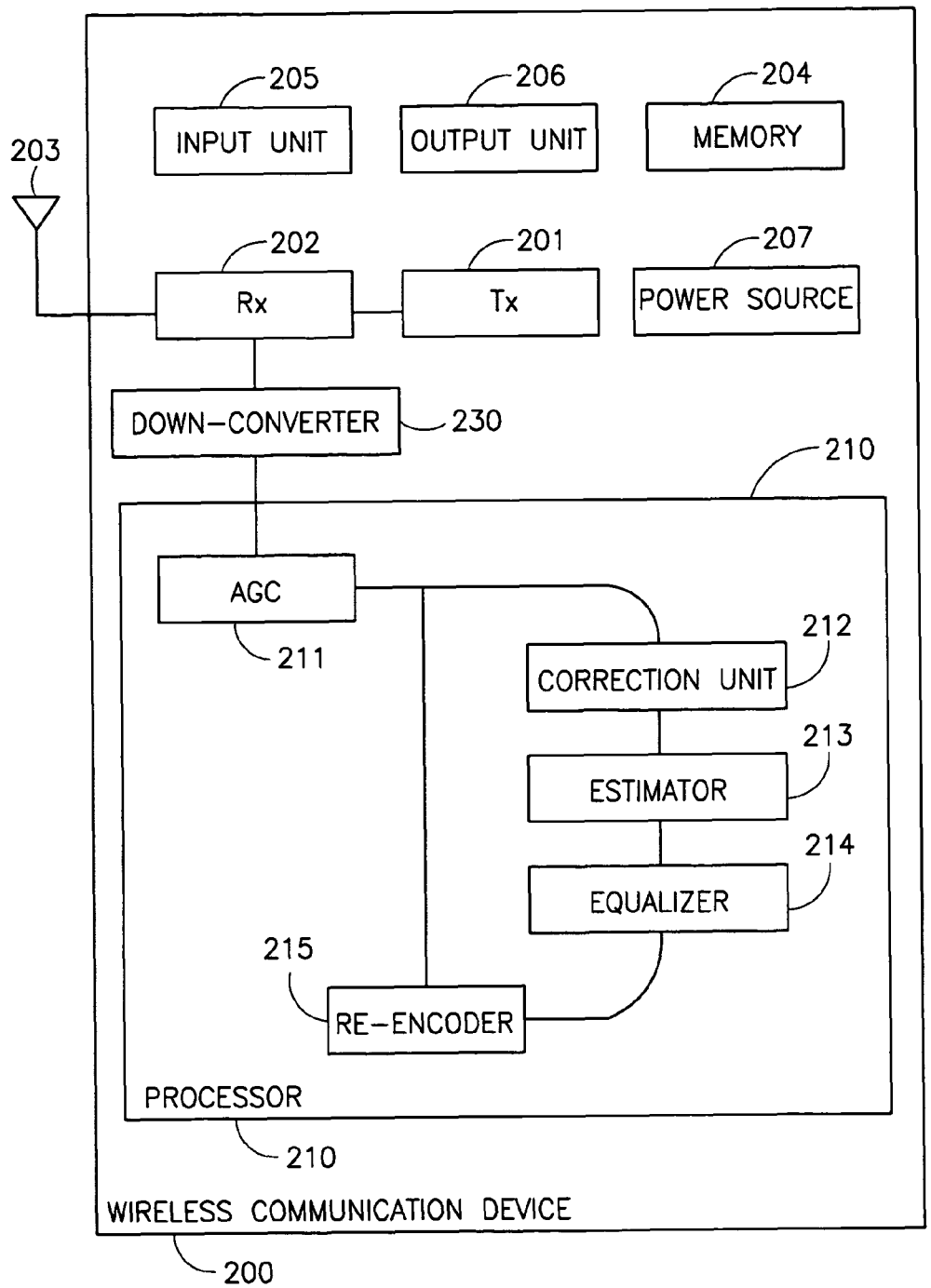
FIG. 2 is a schematic block diagram illustration of a wireless communication device utilizing I/Q mismatch correction in accordance with exemplary embodiments of the invention.

FIG. 2 schematically illustrates a block diagram of a wireless communication device 200 utilizing I/Q mismatch correction in accordance with exemplary embodiments of the invention. Device 200 may be an example of device 101 and/or device 102. Device 200 may include, for example, a transmitter 201, a receiver 202, an antenna 203, a memory unit 204, an input unit 205, an output unit 206, a power source 207, a down-converter 230, and a processor 210. Device 200 may include other suitable hardware components and/or software components.

Transmitter 201 may include, for example, a Radio Frequency (RF) transmitter able to transmit wireless communication signals. Receiver 202 may include, for example, a RF receiver able to receive wireless communication signals. In some embodiments, transmitter 201 and receiver 202 may be implemented in the form of a transceiver, a transmitter-receiver, or one or more units able to perform separate or integrated functions of transmitting and/or receiving wireless communication signals, blocks, frames, packets, messages and/or data.

Antenna 203 may include an internal and/or external RF antenna. In some embodiments, for example, antenna 203 may include a dipole antenna, a monopole antenna, an omni-directional antenna, an end fed antenna, a circularly polarized antenna, a micro-strip antenna, a diversity antenna, or any other type of antenna suitable for sending and/or receiving wireless communication signals, blocks, frames, packets, messages and/or data.

Memory unit 204 may include, for example, a Random Access Memory (RAM), a Read Only Memory (ROM), a Dynamic RAM (DRAM), a Synchronous DRAM (SD-RAM), a Flash memory, a volatile memory, a non-volatile memory, a cache memory, a buffer, a short term memory unit, a long term memory unit, or other suitable memory units or storage units. In some embodiments, for example, memory unit 204 may store data transmitted or received by device 200.

Input unit 205 may include, for example, a keypad, a keyboard, one or more keys, a touchpad, a joystick, a mouse, a pointing device, a user interface, one or more buttons, one or more switches, one or more sliders, an on/off button or switch, or other suitable input components. In some embodiments, input unit 205 may input a suitable audio input component, e.g., an internal or external microphone, and/or a suitable video input component, e.g., an internal or external photo camera or a video camera.

Output unit 206 may include, for example, a screen or monitor. In some embodiments, output unit 206 may include a suitable audio output component, e.g., one or more speakers, earphones or headphones. Output unit 206 may optionally include other types of indicators, for example, a vibrator able to vibrate, or a Light Emitting Diode (LED) able to illuminate.

Power source 207 may include one or more batteries or power cells, which may be external and/or internal, rechargeable or non rechargeable. Power source 270 may provide power to one or more components of device 200.

Down-converter 230 may include, for example, a circuit or unit able to down-convert a received signal having I and Q components (referred to herein as "I/Q signal"). For example, in one embodiment, down-converter 230 may include two processing paths as is known in the art, e.g., using mixers, a Local Oscillator (LO), a 90 degrees phase-shifter, Band Pass Filter (BPF) units, Analog to Digital (A/D) converters, and Low Pass Filter (LPF) units.

Processor 210 may include, for example, a Central Processing Unit (CPU), a Digital Signal Processor (DSP), a baseband processor, an application-side processor, a processor core, a microprocessor, a controller, a circuit, circuitry, an Integrated Circuit (IC), a plurality of controllers and/or circuits, a chip, a microchip, or any other suitable multi-purpose or specific processor, circuit or controller. In some embodiments, for example, processor 210 may perform processing operations which may be used in producing signals transmitted by device 200 or in processing signals received by device 200. Processor 210 may include one or more sub-units, for example, an Automatic Gain Control (AGC) unit 211, an I/Q mismatch analysis and correction unit 212, a channel estimator 213, an equalizer 214, and an encoder or re-encoder 215. It is noted that in some embodiments, one or more of these sub-units may be implemented as separate units which may be external or internal to processor 210, or as one or more software modules, software components, micro-code and/or hardware components.

In accordance with some embodiments of the invention, receiver 202 may receive an input signal, e.g., an incoming wireless signal, which may include an I component and a Q component. Down-converter 230 may down-convert the I/Q signal as is known in the art. The I/Q signal may be transferred to processor 210, e.g., to AGC 211 of processor 210, which may control the gain of the I/Q signal as is known in the art.

In some embodiments, channel estimator 213 may estimate a channel based on a Training Sequence (TS) included in the I/Q signal. Then, symbols transmitted in the I/Q signal may be estimated, for example, using equalizer 214 or another suitable sub-optimal decision mechanism, e.g., a mechanism based on a strongest survivor scheme.

In accordance with some embodiments of the invention, the estimated symbols may be re-encoded, for example, using encoder or re-encoder 215. The re-encoded symbols may be transferred to the I/Q analysis and correction unit 212, which may perform I/Q analysis operations and/or I/Q correction operations based on a pre-defined scheme or algorithm; for example, in some embodiments, correction unit 212 may estimate an I/Q mismatch using one or more Least Mean Square (LMS) calculations, e.g., using an LMS algorithm similar to the algorithm presented in pseudo-code as Code I and described in detail below. The estimated I/Q mismatch may be corrected or cancelled, for example, by correction unit 212, based on applying a pre-defined correction matrix or correction function, e.g., using a correction function as reflected in Code 1 below. After the appropriate correction operations are applied, the channel may be re-estimated using channel estimator 213 based on the corrected signal, and the symbols may be re-estimated using equalizer 214.

In some embodiments of the invention, the process of re-encoding the symbols using re-encoder 215, performing I/Q mismatch analysis operations and correction operations using correction unit 212, estimating the channel using channel estimator 213, and estimating the symbols 214, may be performed once or may be repeated a number of times. In one embodiment, for example, a pre-determined number of iterations, e.g., two iterations, of the above-described operations may be performed. In some embodiments, for example, the number of iterations may be based on one or more pre-defined criteria, e.g., iterations may be repeated until a calculated I/Q mismatch is smaller than a pre-defined threshold value, or until a predefined period of time elapses.

In one embodiment, optionally, in a first iteration, the estimation operations performed by channel estimator 213 on the TS, may be performed on a TS that already passed through correction unit 212, e.g., for an initial I/Q mismatch correction and/or analysis. In another embodiment, in a first iteration, a non-corrected TS may be used for initial channel estimation, e.g., as the TS may be too short to allow a reliable I/Q mismatch or analysis process.

In one embodiment, the I/Q mismatch analysis and correction unit 212 may include an analysis module and a correction module, implemented using hardware components and/or software components, integrated as one unit. In another embodiment, the I/Q mismatch analysis and correction unit 212 may include a plurality of sub-modules or sub-components, for example, an analyzer module or analyzer unit to perform an analysis of the I/Q mismatch, and a correction unit to perform correction operations or to correct an I/Q mismatch.

It is noted that in some embodiments, the handling of the I/Q mismatch may allow, for example, reduction or elimination of the I/Q mismatch, and may be followed by other processing operations to further process the I/Q signal as is known in the art.

In some embodiments, correction unit 212 may utilize a pre-defined algorithm, code, function, correction matrix, or other suitable scheme, to perform I/Q mismatch analysis operations and correction operations. In one embodiment, for example, correction unit 212 may use an algorithm based on the following pseudo-code:

---

Code 1

```
for index1=1:Niterations
    %Correction Matrix:
    Cor=1/(sqrt(B_est)*cos(T_est))*  [ B_est*cos(T_est/2)      -sin(T_est/2)...
                                     ;-B_est*sin(T_est/2)      cos(T_est/2) ];
    %d(cor)/d(T_est):
    B1 =sin(T_est)/(sqrt(B_est)*(cos(T_est))^2) *    [ B_est*cos(T_est/2)      -sin(T_est/2)    ...
                                                     ;-B_est*sin(T_est/2)      cos (T_est/2)   ]...
        -1/(sqrt(B_est)*cos(T_est)) *  [ B_est/2*sin(T_est/2)       1/2*cos(T_est/2)...
                                       ; B_est/2*cos(T_est/2)       1/2*sin(T_est/2)];
    %d(cor)/d(B_est):
```

-continued

Code 1

```
B2 =-1/(2*B_est^1.5*cos(T_est)) *    [ B_est*cos(T_est/2)        -sin(T_est/2)    ...
                                    ; -B_est*sin(T_est/2)         cos(T_est/2)    ]...
    +1/(sqrt(B_est)*cos(T_est)) *    [ cos(T_est/2)               0               ...
                                    ; -sin(T_est/2)               0               ];
B1_vector=B1(1,1)+B1(1,2)+j*(B1(2,1)+B1(2,2));
B2_vector=B2(1,1)+B2(1,2)+j*(B2(2,1)+B2(2,2));
%Pass Received Samples via Correction Matrix:
for index2=1:Nsamples
    x=Cor*[real(Vf(index2)) ; imag(Vf(index2))];
    Vfcor(index2)=x(1)+j*x(2);
    B1xIQvec(index2)=B1_vector;
    B2xIQvec(index2)=B2_vector;
end;
SqrErr=(Vfcor-K*Vm);
dSqrErr_dB_est=2*real(SqrErr).*real(B2xIQvec)+2*imag(SqrErr).*imag(B2xIQvec);
dSqrErr_dT_est=2*real(SqrErr).*real(B1xIQvec)+2*imag(SqrErr).*imag(B1xIQvec);
B_est=B_est+sign*StepSize_B*sum(dSqrErr_dB_est);
T_est=T_est+sign*StepSize_T*sum(dSqrErr_dT_est);
end;
``` wherein:

Cor may indicate an I/Q mismatch correction matrix;

B_est may indicate a gain mismatch estimation;

T_est may indicate a phase mismatch estimation;

Vcor may indicate a signal after I/Q mismatch correction;

Vm may indicate an expected signal, e.g., re-encoded symbols;

Vf may indicate a received signal, e.g., having an I/Q mismatch;

B1 may indicate d(cor)/d(T_est);

B2 may indicate d(cor)/d(B_est);

SqrErr, may indicate a complex error function between Vm and Vf;

dSqrErr_dB_est may indicate the gradient of SqrErr with respect to B_est; and dSqrErr_dT_est may indicate the gradient of SqrErr with respect to T_est.

Although embodiments of the invention are not limited in this regard, execution of Code 1 may apply a correction matrix, Cor, which may be the inverse matrix of a gain and/or phase mismatch model corresponding to the received I and Q components. For linearity reasons, if the two unknown parameters of an I/Q mismatch, namely, a gain mismatch and a phase mismatch, were a-priory known, then the multiplication of received distorted samples with Cor may yield a signal with significantly reduced or eliminated I/Q mismatch. Since the gain mismatch parameter and/or the phase mismatch parameter may not be a-priory known, Code 1 may implement a LMS algorithm to find substantiality best values per iteration. For example, Code 1 may determine the value of a gain mismatch (namely, B_est) and the value of a phase mismatch (namely, T_est) that may minimize the error between the expected signal (namely, Vm) and the distorted signal (namely, Vf) multiplied by the correction matrix (namely, Cor). This may be performed, for example, by determining values that result in substantially zero gradient of the error function with respect to the two unknown parameters, namely, the gain mismatch parameter and the phase mismatch parameters. In some embodiments, for example, the shapes of the gradients (namely, B1 and B2) may be analytically defined or determined. In one embodiment, for example, the algorithm may begin with an initial random value, then calculate the error function, and then iteratively update the estimation of B_est and T_est based on the magnitude and direction of the gradient, thereby minimizing the error function and yielding the best fit for the Cor matrix. Upon finding the best fit, the received samples may be multiplied by the Cor matrix in order to cancel the I/Q mismatch.

It is noted that Code 1 is presented herein for exemplary purposes only, and embodiments of the invention are not limited in this regard and may utilize other suitable algorithms, functions, codes, pseudo-codes, instructions, correction matrices, procedures, sets of instructions, schemes, calculations, equations, formulae, parameters, or the like.

Figure 3:
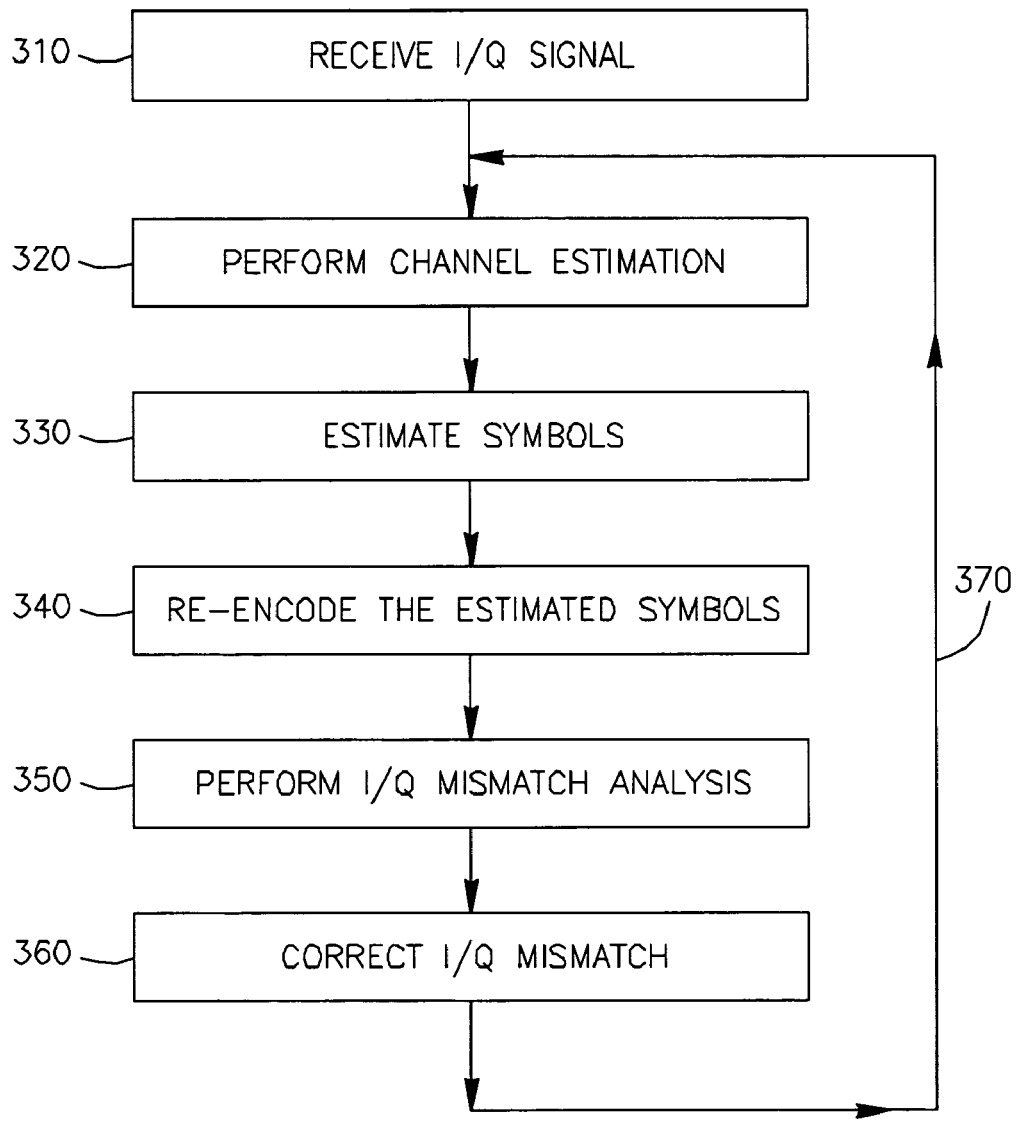
FIG. 3 is a schematic flow-chart of a method of I/Q mismatch correction in accordance with exemplary embodiments of the invention.

FIG. 3 is a schematic flow-chart of a method of I/Q mismatch correction in accordance with exemplary embodiments of the invention. The method may be used, for example, by system 100 of FIG. 1, by device 101 or device 102 of FIG. 1, by device 200 of FIG. 2, by processor 210 and/or correction unit 212 of FIG. 2, or by other suitable processors, controllers, circuits, units, wireless communication devices, stations, systems and/or networks. In some embodiments, the method may be used, for example, to digitally correct or cancel an I/Q mismatch, or to correct or cancel an I/Q mismatch of a signal in a digital format.

As indicated at box 310, the method may include, for example, receiving an I/Q signal, e.g., by processor 210. As indicate at box 320, the method may include, for example, performing channel estimation based on a Training Sequence (TS) included in the I/Q signal, e.g., by channel estimator 213. As indicated at box 330, the method may include estimating symbols transmitted in the I/Q signal, for example, using equalizer 214.

As indicated at box 340, the method may include, for example, re-encoding the estimated symbols, e.g., using re-encoder 215. As indicated at box 350, the method may include, for example, performing I/Q mismatch analysis, e.g., by correction unit 212. These operations may be performed, for example, based on a pre-defined scheme or algorithm. For example, LMS calculations may be used to estimate an I/Q mismatch, e.g., using an algorithm similar to the algorithm presented in pseudo-code as Code 1.

As indicated at box 360, the method may include correcting or canceling the estimated IQ mismatch. This may be performed, for example, by correction unit 212 based on a pre-defined correction matrix or correction function, e.g., a correction function similar to that reflected in Code 1.

As indicated by arrow 370, the channel estimation operations of block 320, the symbols estimation operations of box 330, the re-encoding operations of box 340, the I/Q mismatch analysis operations of box 350, and the I/Q mismatch correcting or canceling operations of box 360, may be repeated for one or more iterations. In one embodiment, for example, a pre-determined number of iterations, e.g., two iterations, of the above-described operations may be performed. In some embodiments, for example, the number of iterations may be based on one or more pre-defined criteria, e.g., a series of iterations may be repeated until a calculated I/Q mismatch is smaller than a pre-defined threshold value, or until a pre-defined period of time elapses. In some embodiments, results or corrected data produced in a first iteration may be used as the starting values for the operations of a second, subsequent, iteration.

In some embodiments, the I/Q analysis operations and/or I/Q correction operations of box 350, and the correcting or canceling operations of box 360, may utilize a pre-defined algorithm, code, function, correction matrix, or scheme. In one embodiment, for example, the method may include using an algorithm similar to the algorithm presented in the pseudo-code of Code 1 above.

Other suitable operations or sets of operations may be used in accordance with embodiments of the invention.

Some embodiments of the invention may be implemented by software, by hardware, or by any combination of software and/or hardware as may be suitable for specific applications or in accordance with specific design requirements. Embodiments of the invention may include units and/or sub-units, which may be separate of each other or combined together, in whole or in part, and may be implemented using specific, multi-purpose or general processors, circuits or controllers, or devices as are known in the art. Some embodiments of the invention may include buffers, registers, storage units and/or memory units, for temporary or long-term storage of data or in order to facilitate the operation of a specific embodiment.

Some embodiments of the invention may be implemented, for example, using a machine-readable medium or article which may store an instruction or a set of instructions that, if executed by a machine, for example, by device 101, by device 102, by device 200, by processor 210, by correction unit 212, by re-encoder 215, or by other suitable machines, cause the machine to perform a method and/or operations in accordance with embodiments of the invention. Such machine may include, for example, any suitable processing platform, computing platform, computing device, processing device, computing system, processing system, computer, processor, or the like, and may be implemented using any suitable combination of hardware and/or software. The machine-readable medium or article may include, for example, any suitable type of memory unit (e.g., memory unit 204), memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Re-Writeable (CD-RW), optical disk, magnetic media, various types of Digital Versatile Disks (DVDs), a tape, a cassette, or the like. The instructions may include any suitable type of code, for example, source code, compiled code, interpreted code, executable code, static code, dynamic code, or the like, and may be implemented using any suitable high-level, low-level, object-oriented, visual, compiled and/or interpreted programming language, e.g., C, C++, Java, BASIC, Pascal, Fortran, Cobol, assembly language, machine code, or the like.

While certain features of the invention have been illustrated and described herein, many modifications, substitutions, changes, and equivalents may occur to those skilled in the art. It is, therefore, to be understood that the appended claims are intended to cover all such modifications and changes as fall within the true spirit of the invention.

What is claimed is:

1. A method comprising:
receiving a signal having an in-phase component and a quadrature component;
analyzing a mismatch between said in-phase component and said quadrature component;
re-encoding an estimated symbol of the signal to generate a re-encoded signal, said re-encoding of said estimated symbol being based on said analyzing the mismatch; and
processing the re-encoded signal using a correction function, which is a function of a correction matrix Cor, to correct said mismatch between said in-phase component and said quadrature component, wherein said correction matrix Cor is given by:

$$Cor = \frac{1}{\sqrt{B\_est} * \cos(T\_est)} * \begin{bmatrix} B\_est * \cos\left(\frac{T\_est}{2}\right) & -\sin\left(\frac{T\_est}{2}\right) \\ -B\_est * \cos\left(\frac{T\_est}{2}\right) & \cos\left(\frac{T\_est}{2}\right) \end{bmatrix},$$

where B_est is an estimation of a substantially best value gain mismatch, and T_est is an estimation of a substantially best value phase mismatch of said in-phase component and said quadrature component.

2. The method of claim 1, further comprising re-estimating a channel over which the signal is received, based on a Training Sequence of the processed re-encoded signal.

3. The method of claim 2, further comprising re-estimating the estimated symbol of the signal, based on the processing the re-encoded signal.

4. The method of claim 3, further comprising repeating (i) the re-encoding the estimated symbol of the signal, (ii) the processing the re-encoded signal using the correction function, (iii) the re-estimating the channel, and (iv) the re-estimating the estimated symbol, two or more times.

5. The method of claim 4, wherein the repeating comprises:
repeating (i) the re-encoding the estimated symbol of the signal, (ii) the processing the re-encoded signal using the correction function, (iii) the re-estimating the channel, and (iv) the re-estimating the estimated symbol, until a calculated mismatch between the in-phase component and the quadrature component is smaller than a pre-defined threshold.

6. The method of claim 1, further comprising
determining the substantially best value gain mismatch and substantially best value phase mismatch using a Least Mean Square algorithm.

* * * * *